(12) United States Patent
Kang et al.

(10) Patent No.: US 12,083,683 B2
(45) Date of Patent: Sep. 10, 2024

(54) CLOUD BASED COMPUTER-IMPLEMENTED SYSTEM AND METHOD FOR GROUPING ACTION ITEMS ON VISUAL PROGRAMMING PANEL IN ROBOT SIMULATOR

(71) Applicant: SMART BUILDING TECH CO., LTD., New Taipei (TW)

(72) Inventors: Shih-Chung Kang, New Taipei (TW); Liang-Ting Tsai, New Taipei (TW); Cheng-Hsuan Yang, New Taipei (TW)

(73) Assignee: ROBIM TECHNOLOGIES INC. OF CANADA, Edmonton (CA)

( * ) Notice: Subject to any disclaimer, the term of this patent is extended or adjusted under 35 U.S.C. 154(b) by 272 days.

(21) Appl. No.: 17/405,215

(22) Filed: Aug. 18, 2021

(65) Prior Publication Data

US 2022/0055216 A1 Feb. 24, 2022

Related U.S. Application Data (60) Provisional application No. 63/068,063, filed on Aug. 20, 2020.

(51) Int. Cl.
*B25J 9/00* (2006.01)
*B25J 9/16* (2006.01)

(52) U.S. Cl.
CPC ........... *B25J 9/1671* (2013.01); *B25J 9/0084* (2013.01); *B25J 9/1661* (2013.01)

(58) Field of Classification Search
CPC ...... B25J 9/1671; B25J 9/0084; B25J 9/1661; G05B 2219/40392
See application file for complete search history.

(56) References Cited

U.S. PATENT DOCUMENTS

| | | | |
|---|---|---|---|
| 11,420,330 B2* | 8/2022 | Nishitani | B25J 9/1671 |
| 2013/0116828 A1* | 5/2013 | Krause | G05B 19/409 |
| | | | 700/264 |

(Continued)

FOREIGN PATENT DOCUMENTS

| | | | | |
|---|---|---|---|---|
| CN | 110405730 A | * | 11/2019 | ............ B25J 9/0081 |
| CN | 211669880 U | * | 10/2020 | |

(Continued)

OTHER PUBLICATIONS

CN110405730A_ManMachineObject . . . pdf, Cong et al. (Year: 2019).*

(Continued)

*Primary Examiner* — Jonathan L Sample
*Assistant Examiner* — Shaheda Shabnam Hoque
(74) *Attorney, Agent, or Firm* — Demian K. Jackson; Jackson IPG PLLC (57) ABSTRACT

The present invention relates to a computer-implemented method. The method includes steps of causing a visual programming panel including a timeline editor and a variety of action blocks configured to enable a variety of basic actions correspondingly for a target robot to perform to be displayed in a visualization interface provided by a robot simulator shown on a web browser; at the visual programming panel, operating by a user to group at least two action blocks representing at least two basic actions selected from the variety of basic actions to form an action collection; and generating a program capable of commanding an end effector equipped on the target robot in a work cell to perform according to the action collection in the robot simulator.

11 Claims, 8 Drawing Sheets

(56) References Cited

U.S. PATENT DOCUMENTS

| | | | | |
|---|---|---|---|---|
| 2015/0379171 A1* | 12/2015 | Kuwahara | ............... | G06F 30/20 |
| | | | | 703/13 |
| 2019/0308322 A1* | 10/2019 | Nishitani | ............... | B25J 9/1666 |
| 2020/0061821 A1* | 2/2020 | Linnell | ................... | B25J 9/1664 |
| 2020/0410064 A1* | 12/2020 | Bauer | ....................... | G06N 3/08 |
| 2021/0138651 A1* | 5/2021 | Mcgregor | .............. | B25J 9/1671 |

FOREIGN PATENT DOCUMENTS

| | | | | | |
|---|---|---|---|---|---|
| CN | 109760059 B | * | 12/2020 | | |
| CN | 212957704 U | * | 4/2021 | | |
| CN | 112783018 A | * | 5/2021 | ............ | B25J 9/1671 |
| JP | 7391317 B2 | * | 12/2023 | | |
| WO | WO-2021205776 A1 | * | 10/2021 | ............. | G06F 30/20 |
| WO | WO-2023074249 A1 | * | 5/2023 | | |

OTHER PUBLICATIONS

HotkeyEnabledGUIApplicationGroupingTechnology.pdf, Authors et al. (Year: 2008).*

Model-driven_tenant_development_for_Paas-based-Saas.pdf, Tsai et al. (Year: 2012).*

A_Visual_Programming_Framework_for_Complex_Robotic_Systems_in_Micro-Optical_Assembly.pdf (Year: 2014).*

J. Rossmann, M. Schluse, M. Hoppen, D. Losch, N. Hempe and C. Schlette, "Virtual BIM Testbeds: The eRobotics Approach to BIM and Its Integration into Simulation, Rendering, Virtual Reality and More," 2015 International Conference on Developments of E-Systems Engineering (DeSE), Dubai, U.A.E, 2015 (Year: 2015).*

\* cited by examiner

CLOUD BASED COMPUTER-IMPLEMENTED SYSTEM AND METHOD FOR GROUPING ACTION ITEMS ON VISUAL PROGRAMMING PANEL IN ROBOT SIMULATOR

CROSS-REFERENCE TO RELATED APPLICATION

This application is based upon and claims the benefits of priorities to U.S. Provisional Application No. U.S. 63/068,063, filed on Aug. 20, 2020, now pending, the entire disclosures of which are incorporated herein by reference.

Cross-references are also made to applicant/assignee's previous U.S. Invention U.S. patent application Ser. No. 17/218,685, filed on Mar. 31, 2021, and U.S. Invention patent application Ser. No. 17/218,653, filed on Mar. 31, 2021, now pending, which are incorporated herein by reference.

COPYRIGHT NOTICE

A portion of the disclosure including at least descriptions, embodiments, claims, and drawings of this patent document contains materials that are subject to copyright protection. The copyright owner has no objection to the reproduction of the patent document or the patent disclosure, as it appears in the U.S. Patent and Trademark Office patent file or records, but otherwise reserves all copyright rights whatsoever.

FIELD

The present invention relates to a cloud based computer-implemented system and method for grouping multiple action items on a visual programming panel in a robot simulator to form an action macro, an action group, and an action collection.

BACKGROUND

Robotic automation process in building construction is an emerging technology and involves the use of one or more robotic devices that are applied to construct the building or essential components composing the building, such as a floor panel, a wall panel, a door panel, a window panel, or any other components, in a fully automatic or semi-automatic way.

The robotic devices are usually equipped with end effector to mount and connect tools, such as a gripper or a drill, that is used during the constructing process. The robotic devices are pre-programmed with sequences of specific motion commands and commands for other operations in order to cause the robotic devices to complete the constructing process.

The robotic automation construction is suitable for constructing unique and special structures with features of high complexity, high-mix, and low-volume, and is proved with high degrees of versatility, diversity and flexibility to perform construction works. Through the decades of development, currently there are two major robotic automation construction methods available, the on-site robotic construction scheme and the off-site robotic construction scheme.

However, the preparation of numerous parameters, actions, motions and paths of the robotic devices to carry out the constructing process is highly complicated and sophisticated, required to be scheduled, planned, validated, and rehearsed repetitively for many times, prior to the commencement of the constructing process, and impossible to be done by using actual robotic devices.

Therefore, there have been proposed quite a few conventional various robot simulators, to duly assist users in performing the preparation. These robot simulators are usually equipped with physics engine to enable action and motion physics simulations for a robot to perform in the virtual reality in the simulator.

Nevertheless, the issue is, the user operating interfaces provided by these robot simulators are yet too complicated to learn and use, although they are usually designed and built in the graphics based way for users to operate. Sometimes, these user operating interfaces further lack of efficiency. For example, it requires hundreds of thousands of complicated basic robot action units to complete a component prefabrication task. However, it is hardly to review all robot action units within one interface.

Hence, the conventional robot simulators need more advanced, well designed and highly efficient interfaces in order to release its full power. There is also a need to further develop and design a series of assisted functional operable panel or panels with customizable configurations and capable of collecting, collapsing, grouping, or clustering as many and simple as possible robot action units within one interface, to solve the above deficiencies/issues.

SUMMARY

In view of the state of the art, the present invention provides a cloud based computer-implemented system and method for collecting, collapsing, grouping, clustering or lumping together multiple action items subjected to the same task or having the same attribution on a visual programming panel in a robot simulator to form an action macro, an action group, and an action collection, so as to make it possible to review as many and simple as possible action items within one interface.

Accordingly, the present invention provides a computer-implemented method which includes steps of causing a visual programming panel including a timeline editor and a variety of action blocks configured to enable a variety of basic actions correspondingly for a target robot to perform to be displayed in a visualization interface provided by a robot simulator shown on a web browser; at the visual programming panel, operating by a user to group at least two action blocks representing at least two basic actions selected from the variety of basic actions to form an action collection; and generating a program capable of commanding an end effector equipped on the target robot in a work cell to perform according to the action collection in the robot simulator.

The present invention further provides a computer-implemented system which includes a user device installed with a web browser to enable web browsing to access an internet for a user to operate; and a cloud computing server system available on the internet and configured to: cause a visual programming panel including a timeline editor and a variety of action blocks configured to enable a variety of basic actions correspondingly for a target robot to perform to be displayed in a visualization interface provided by a robot simulator shown on a web browser; at the visual programming panel, operate by a user to group at least two action blocks representing at least two basic actions selected from the variety of basic actions to form an action collection; and generate a program capable of commanding an end effector equipped on the target robot in a work cell to perform according to the action collection in the robot simulator.

The above content described in the summary is intended to provide a simplified summary for the presently disclosed invention, so that readers are able to have an initial and basic understanding to the presently disclosed invention. The above content is not aimed to reveal or disclose a comprehensive and detailed description for the present invention, and is never intended to indicate essential elements in various embodiments in the present invention, or define the scope or coverage in the present invention.

DESCRIPTION OF THE DRAWINGS

A more complete appreciation of the invention and many of the attendant advantages thereof are readily obtained as the same become better understood by reference to the following detailed description when considered in connection with the accompanying drawing, wherein.

DETAILED DESCRIPTION

The present disclosure will be described with respect to particular embodiments and with reference to certain drawings, but the disclosure is not limited thereto but is only limited by the claims. It is clear that other embodiments can be configured according to the knowledge of persons skilled in the art without departing from the true technical teaching of the present disclosure, the claimed disclosure being limited only by the terms of the appended claims.

The drawings described are only schematic and are non-limiting. In the drawings, the size of some of the elements may be exaggerated and not drawn on scale for illustrative purposes. The dimensions and the relative dimensions do not necessarily correspond to actual reductions to practice.

It is to be noticed that the term "including", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device including means A and B" should not be limited to devices consisting only of components A and B.

In this disclosure, the terms "robot", "robots", "robotic device", "robotic devices" and the like refer to any automatically operated mechanical machine which is programmed to perform a wide variety of functions, operations, duties or tasks automatically, may not resemble human beings in appearance or perform in a humanlike manner, and have different scalable formation varied from a lightweight manufacturing robots to a heavy-load or heavy-duty assembly robots. In certain embodiments of the disclosure, the robot is preferably an industrial robot or a multi-axis robot arm, and may be regarded as a robot builder.

The term "building" means any form of building, such as a house, a wooden house, a reinforced concrete building, a steel building, a steel-reinforced concrete building, a residential complex, an apartment complex, a condominium, a dwelling unit, or a skyscraper, which is built by implementing civil engineering means or civil engineering based construction works.

The term "construction base" and "building foundation" refers to a site, a place, an area, a location, a spot, a position, a base or a venue on which a building is under construction. The term "construction site" refers to a site, a place, an area, a location, a spot, a position, a base or a venue where construction works are carried out.

The terms "near-site position", "near site" and the like mean a site, a place, an area, a location, a spot, a position, a base or a venue situated near, in a close proximity to, close to, or next to the construction site, the construction base, or the building foundation preferably less than 50 meters, 100 meters, 150 meters, 30 meters or 500 meters, as well as the terms "near-site position", "near site" and the like mean a site, a place, an area, a location, a spot, a position, a base or a venue situated within a periphery or a periphery area around the construction site and has a diameter preferably less than 50 meters, 100 meters, 150 meters, 30 meters or 500 meters.

The terms "work cell" and "scene" refer to a cluster of robotic devices, equipment, and materials that are required for the robotic device to carry out the fabrication task, in particular a construction component prefabrication task. The configuration of the work cell is highly in association with the productivity and costs. The user is able to try different combinations of work parameters, and change different robotic device to test and find out a better configuration. In this disclosure, the work cell is equivalent to and also known as the scene.

In this disclosure, the terms "robot", "robots", and the like refer to any automatically operated mechanical machine which is programmed to perform a wide variety of functions, operations, duties or tasks automatically, may not resemble human beings in appearance or perform in a humanlike manner, and have different scalable formation varied from a lightweight manufacturing robots to a heavy-load or heavy-duty industrial assembly robots. In certain embodiments of the disclosure, the robot is preferably an industrial robot or a multi-axis robot arm, and may be regarded as a robot builder.

The term "building" means any form of building, such as a house, a wooden house, a reinforced concrete building, a steel building, a steel-reinforced concrete building, a residential complex, an apartment complex, a condominium, a dwelling unit, or a skyscraper, which is built by implementing civil engineering means or civil engineering based construction works.

The terms "work cell" and "scene" refer to a cluster of robots, equipment, and materials that are required for the robot to carry out the fabrication task, in particular a construction component prefabrication task. The configuration of the work cell is highly in association with the productivity and costs. The user is able to try different combinations of work parameters, and change different robot to test and find out and a better configuration. In this disclosure, the work cell is equivalent to and also known as the scene.

Figure 1:
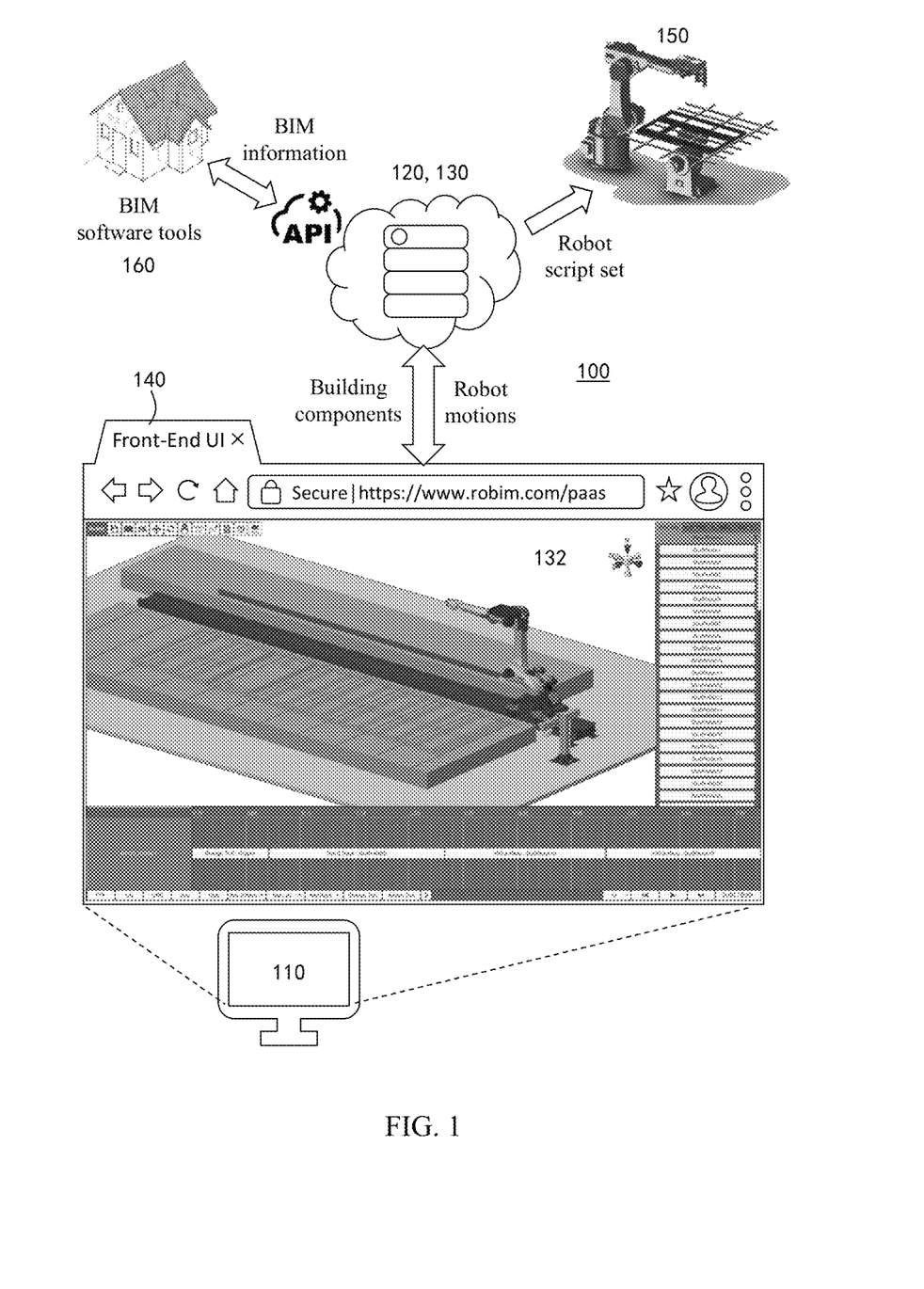
FIG. 1 is a schematic diagram illustrating a system view for a cloud based computer-implemented system according to a first exemplified embodiment of the present invention.

FIG. 1 is a schematic diagram illustrating a system view for a cloud based computer-implemented system according to a first exemplified embodiment of the present invention. FIG. 1 demonstrates an exemplified computer-implemented system 100 that preferably includes at least one user device 110 and a cloud computing server system 120. The cloud computing server system 120 may be a cluster of cloud-based computing servers and provides cloud-based centralized computing power, in contrast to the edge or distributed computing power executed on the separated individual nodes, such as the user device 110.

The user device 110 has the internet capability, is preferably a web-enabled user equipment or an internet capable device that is equipped with appropriate internet connectivity, such as Wi-Fi, Bluetooth, 4G, 5G, 6G, or Sub-1G, and installed with a web browser 140 to enable web browsing to access internet. The exemplified user device 110 preferably is, such as mobile internet device (MID), portable internet device, desktop computer, notebook computer, tablet device, game console, smart glass, or mobile phone device.

A computer-assisted cloud based robotic construction software platform 130 (hereinafter referred to as the platform for short), also known as a robot simulator, is established based on the software as a service (SAAS) technology and the platform as a service (PAAS) technology and a backend cross-platform software. The platform 130 is originally installed and functions on the cloud computing server system 120, addressed on the internet by specifying a uniform resource locator (URL), and thus available to users or subscribers over the internet. Any user is able to access, use, and operate the platform 130 easily by connecting to the internet by one's own user device 110, opening the web browser 140 on the user device 110 and entering the URL directing into the web browser 140.

The platform 130 is configured to generate various visualization interfaces 132 acting as frontend user interfaces in the web browser 140 running on the user device 110. The platform 130 is configured to receive user operations corresponding to interactions with visualization interfaces 132 shown in the web browser 140 from one's own user device 110 as instructions to execute correspondingly and accordingly.

In response to the received user operations, the platform 130 is capable of executing a variety of built-in modules that enable various assistances in all aspects of coordinating, sequencing, scheduling, planning, and simulating robotic motions or paths of one or more robots, for any users to coordinate, sequence, schedule, plan, design, simulate, re-sequence, re-schedule, re-plan, re-design robotic motions or paths for one robot or among more robots. The platform 130 is configured to conclude the determined robotic motions as a predetermined motion command set or a robot script set and output and transmit the set to the respective controllers of the corresponding actual robots 150. The platform 130 further includes a couple of externally-operated modules in a form of add-ins module cooperated with and functions within the building information modelling (BIM) software tools 160, such as AUTODESK REVIT, SketchUp, GRAPHISOFT ARCHICAD, etc., for any users to operate.

Preferably, the robot or robots are industrial-use multi-axis robots and used in construction process, such as semi-automated construction, automated construction, or near-site construction, to perform a physical fabrication task, in particular, a construction component prefabrication task. The construction process may involve the use of one or more robots that may be used to construct a variety of components of a building. The robots may be equipped with end-effector-mounted tools, such as a gripper or a drill, that may be used during construction process. The actual robots are configured and controlled to act according to the predetermined motion command set including sequences or paths of specific motions sent from the respective controllers to complete the specified task.

The platform 130 is preferably a no-code robotic motion simulation software, and the generated visualization interfaces 132 in the web browser 140 may provide multiple visualization-based functions and various easy-to-use robotic programming tools. The platform 130 is configured to provide a simulation to real (sim-to-real) virtual physical environment with built-in physics engine that enables virtual robot objects to simulate or approximate universal forces existing in the real world, such as gravity, velocity, acceleration, friction, etc., for any users with different level of computer skills distributed from ordinary people, such as subscribers or contractors, to professionals, such as programmers, designers or engineers, to simulate robotic motions or paths without writing or typing a single line of code.

In some embodiments, visualization interfaces 132 are embedded with a variety of quick menus, dropdown menus, buttons and toggles with highly customizable configurations for the specific purpose of easy-to-use. Any user from ordinary people, such as subscribers or contractors, to professionals, can perform the planning and simulations for robotic construction process without typing a single line of code and actually actuating the robots. In particular, the visualization interfaces 132 are especially enhanced and improved in the aspect of visualizing the timeline-related arrangement and scheduling processes for robotic motions of a single robot, or among multiple robots.

Figure 2:
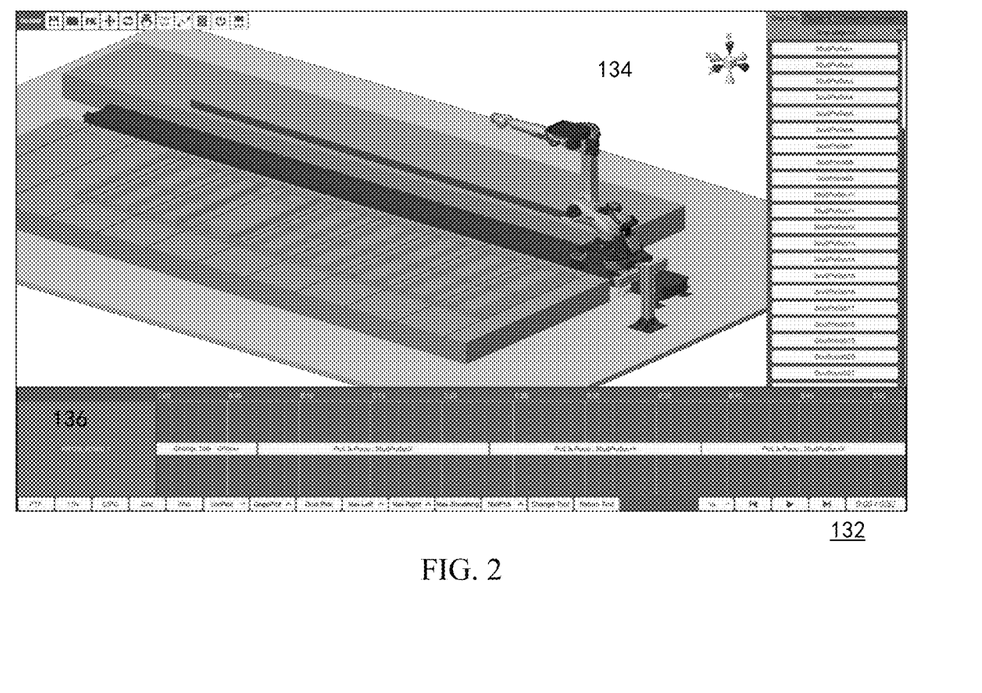
FIG. 2 is a schematic diagram illustrating a standard layout of the visualization interface generated by the platform in accordance with the present invention.

FIG. 2 is a schematic diagram illustrating a standard layout of the visualization interface generated by the platform in accordance with the present invention. The platform 130 is configured to generate a series of visualization interfaces 132 to be provided through the web browser 140 for any user to access and operate the platform 130. Four edges, including the left-hand and right-hand sides and the upper and lower parts, of the respective visualization interfaces 132 are preferably arranged and configured to embed with a variety of functional sidebars, toolbars, operating panels, or functional panels. The most and central part within the respective visualization interfaces 132 is configured to provide a main display window 134 virtually showing an animated simulation for the robots and the work cell. In some embodiments, the visual programming panel 136 is preferably a horizontal toolbar and to be positioned, for example, at the lower part of visualization interface 132.

Figure 3:
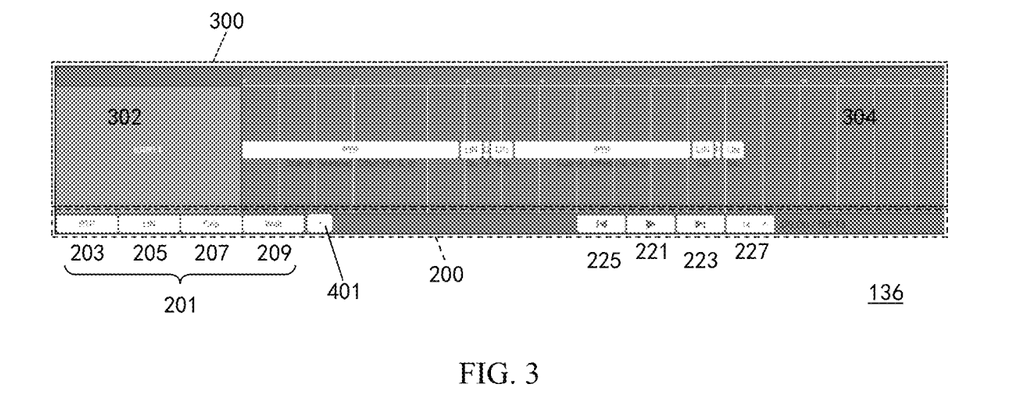
FIG. 3 is a schematic diagram illustrating an exemplified visual programming panel embedded in the visualization interface according to the present invention.

FIG. 3 is a schematic diagram illustrating an exemplified visual programming panel embedded in the visualization interface according to the present invention. The visual programming panel 136 preferably includes at least one timeline editor 300 and a bottom bar 200. The at least one timeline editor 300 is identified by a robot ID filled and designated in the robot ID field 302, which is opened for a user to input, and is assigned to program and configure motions for a target robot corresponding to robot ID.

The timeline editor 300 provides a timeline workspace 304 over a horizontal timeline view in the background. The timeline view may contain multiple timescales that are spaced with each other in an equal or variable distance used to indicate a defaulted time interval, for example, 1 second, in this embodiment. The bottom bar 200 includes a plurality of various basic action blocks 201, and a plurality of control buttons including a play button 221, a forward button 223, a backward button 225, and a play speed button 227, for any users to use.

Each of basic action blocks 201 are labeled with an action name consisting of, such as, a capitalized acronym or one or more words, represent for a specific robotic action, and refer to an action instruction set that consists of a series of, such as, parameters, declarations, statements, and codes that are defaulted by a user to enable the end effector or the robot to complete a specific action consisting of multiple basic actions subject to the given conditions. The action block is referred to as an action unit, an action box, an action element, an action item, or an action component as well. In some embodiments, one or more basic action blocks 201 can be nested within one basic action block 201. Several exemplified basic action blocks 201 are provided in this disclosure.

For instance, the PTP action block 203 is the basic action block 201 labeled with the acronym of PTP and consists of an action instruction set that is generated and defaulted by a user to enable a series of basic actions to achieve a point-to-point (PTP) action to cause the end effector of the robot to complete a movement to move from one point to another point subject to all the given conditions. The Grip action block 207 is one of the basic action blocks 201 labeled with the word of Grip and consists of an action instruction set that enables the end effector to complete a grip action to grip a selected member/object with an adequate pressure subject to the given conditions.

The LIN action block 205 is the basic action block 201 labeled with the acronym of LIN and consists of an action instruction set that enables the end effector to complete a linear movement from one point to another point in a linear trajectory subject to the given conditions. The Wait action block 209 is the basic action block 201 labeled with the word of Wait and consists of an action instruction set that enables the end effector to suspend or stay still in the current position. A Nail action block is the basic action block 201 labeled with the word of Nail and consists of an action instruction set that enables the end effector to perform a nailing action.

The specific basic action which one of the basic action blocks 201 represents for is user-definable, customizable and expandable. The present system 120 allows a user to define and configure a new basic block represents for a new specific basic action by programming a corresponding API. A user may create a new basic block to complete a specific action on one's own interest. The length of each of the blocks 201 represents for the runtime of the specific action, and is adjustable.

The visual programming panel 136 allows a user to code programs and set up configurations required to drive the end effector or the robot in the robot simulator by simply dragging and dropping multiple basic action blocks 201 into the timeline editor 300, in a fun fashion like the building of a puzzle, instead of writing complex computer codes. The spatial arrangement and sequence of the multiple basic action blocks 201 on the timeline workspace 304 in the timeline editor 300 is the sequence of specific actions performed in the robot simulator.

In some embodiments, while the scene, and the conditions and parameters are given and set up, and the target robot is designated in the robot ID field 302, a particular basic action block 201 representing for a specific action, for example, a PTP action block 203 representing a point-to-point action, is selected and dragged into the timeline editor 300. The length of the PTP action block 203 is duly adjusted and represents for the runtime. The fixed-interval timescales distributed over the timeline view is capable of assisting in the estimation of the runtime for completing the point-to-point action.

More basic action blocks 201 are allowed to be added into the timeline workspace 304 in the timeline editor 300 with a particular sequence to form a chain of actions for the target robot to perform in the robot simulator. In some embodiments, multiple block including the LIN action block 205, the Grip action block 207, the LIN action block 205, the PTP action block 203, the LIN action block 205, the Grip action block 207, and the LIN action block 205, are sequentially added into the timeline workspace 304, as shown in FIG. 3. In FIG. 3, the horizontal spatial arrangement of the above all action blocks in the timeline editor 300 refers to a chain of actions to be performed by the target robot in the robot simulator. The timeline editor 300 demonstrates how a set of robotic actions is sequenced and scheduled overtime as well.

Whenever a user feels the arrangements of the action blocks are completed anytime, the play button 221 is able to be clicked to commence the animated simulation of the scheduled and programmed chain of actions in the main display window 134. The present visual programming panel 136 is helpful to reduce the barrier of entry to use the platform 130 for any naive player or user who even does not know how to write or type a single line of code to simulate the robotic construction.

When the animated simulation shows an acceptable result for the robotic actions, the robot simulator concludes the corresponding configurations and simulation results by transforming the programmed robotic actions configured on the visual programming panel into an action command set including the corresponding required coding, and streams out the action command set to the designated actual robot to move accordingly, so as to perform tasks in, for example, an off-site robotic construction.

Furthermore, the platform 130 provides an action macro panel that is popped out over the top of the respective visualization interfaces 132 by click by user. The action macro panel provides a series of dropdown menus and parameter setup fields for a user to define, create and configure a new action simply by combining multiple basic actions. In some embodiments, for example, a macro panel activation and expansion button 401 is shown and embedded in the bottom bar 200 and an action macro panel is correspondingly popped up while the macro panel activation and expansion button 401 is clicked.

An action macro panel is used for configuring an action macro (action collection) which refers to a set of sequential configurations of action parameters. A user is allowed to add, delete and modify the configurations in the action macro panel. After editing the configurations, the platform 130 automatically uploads and saves the configuration file to the cloud computing server system 120. When the user logs in to the platform 130 next time, the platform 130 automatically downloads and reads the saved configurations from the cloud computing server system 120. Therefore, the user is able to reuse these action macros across scenarios and platforms.

Figure 4:
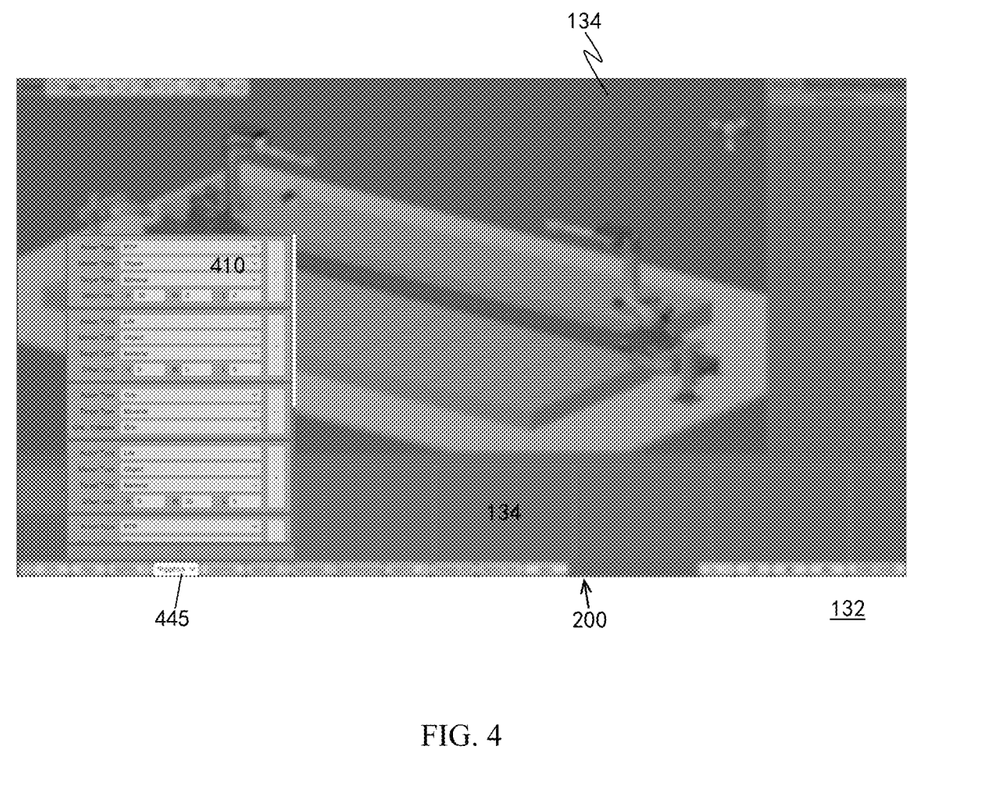
FIG. 4 and FIG. 5 are schematic diagrams illustrating an exemplified action macro panel generated by the platform shown in the visualization interface in accordance with the present invention.
Figure 5:
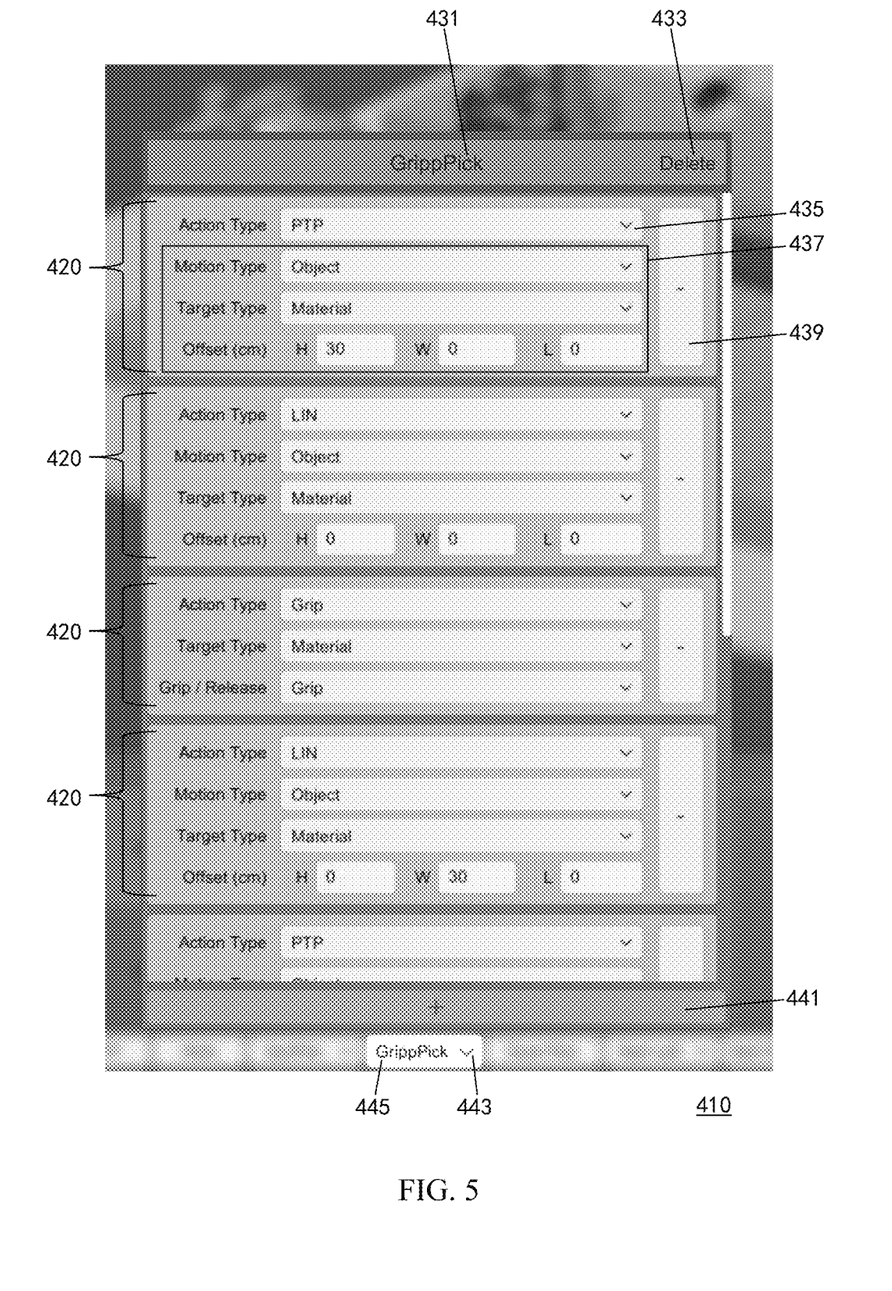

FIG. 4 and FIG. 5 are schematic diagrams illustrating an exemplified action macro panel generated by the platform shown in the visualization interface in accordance with the present invention. When the macro panel activation and expansion button 401 is pressed, the action macro panel 410 is opened and expanded over the top of the visualization interface 132, and the contains in the main display window 134 and the visual programming panel 136 in the background is slightly blurred.

The action macro panel 410 consists of multiple action editor 420, each of which the action editors 420 represent for one basic action. There are multiple functional blocks are contained in every action editor 420. The naming text field 431 is configured to be pressed to rename the current action macro. In this embodiment, the name of the current action macro is titled as, for example, GrippPick. The delete action button 433 is configured to be pressed to delete the current action macro. The action type dropdown menu 435 is configured to be pressed to demonstrate the action type list that shows all basic actions available for a user to select. The available basic actions include at least the PTP basic action, the Grip basic action, the LIN basic action, the Wait action, and the Nail action.

The action parameter list field 437 is configured to show all available parameters corresponding to the current action type opened for a user to select. The available parameters include the motion type, the target type, the offset distance, etc. The remove button 439 is configured to be pressed to remove or delete the action editors 420 corresponding to a specific basic action from the current action macro panel 410. The new basic action button 441 is configured to be pressed to add a new action editor 420 representing and corresponding to a basic action. The close panel button 443 is configured to be pressed to collapse the current action macro panel 410. When the close panel button 443 is pressed and all the parameters and configuration defined in the current action macro panel 410 is uploaded to and saved in the cloud computing server system 120.

A GrippPick action block 445 corresponding to the newly created GrippPick action is then added into and shown in the bottom bar 200 to represent the user-defined GrippPick action. The GrippPick action block 445 provides for a user to operate as well as the other action blocks 201, for example, the action blocks 203, 205, 207, 209, etc. A user is able to select the GrippPick action block 445 and add it into the timeline workspace 304 in the timeline editor 300 to configure the chain of actions by drag operations. In some embodiment, the user is able to define more actions and create multiple blocks, such as, the VacPick block representing the user-defined VacPick action macro, the Dual Pick block representing the user-defined Dual Pick action macro, the Nail Left block, the Nail Right block, the Nail Sheathing, etc., as shown in FIG. 2.

By utilizing the action macro panel, any users are allowed to configure new action simply by dragging and dropping the basic blocks into the timeline editor. The blocks are also referred to as and replaceable by graphical or iconic elements or boxes.

The following TABLE 1 and TABLE 2 are lists of parameters currently available in the action editor 420 of the action macro panel 410 on the platform 130. The vertical column refers to the action type, and the horizontal row refers to the parameters of the action macro corresponding to the action type.

TABLE 1

| Action Type | Parameter Target Type | Position float3 | Rotation float3 | A1-A6 Data Type float array | Speed float | Status int3 |
|---|---|---|---|---|---|---|
| PTP | Transform | V | V | — | V | V |
|  | Angle | — | — | V | V | — |
|  | Object | — | — | — | V | V |
| LIN | Transform | V | V | — | V | V |
|  | Angle | — | — | V | V | — |
|  | Object | — | — | — | V | V |
| CIRC | Transform | V | V | — | V | V |
|  | Angle | — | — | V | V | — |
|  | Object | — | — | — | V | V |
| Grip | — | — | — | — | — | — |
| Wait | — | — | — | — | — | — |

TABLE 2

| Action Type | Parameter Target Type | Via-point float3 | Target Type Data Type bool | Offset float3 | Digital Output bool | Wait Time float |
|---|---|---|---|---|---|---|
| PTP | Transform | — | — | — | — | — |
|  | Angle | — | — | — | — | — |
|  | Object | — | V | V | — | — |
| LIN | Transform | — | — | — | — | — |
|  | Angle | — | — | — | — | — |
|  | Object | — | V | V | — | — |
| CIRC | Transform | V | — | — | — | — |
|  | Angle | V | — | — | — | — |
|  | Object | V | V | V | — | — |
| Grip | — | — | V | — | V | — |
| Wait | — | — | — | — | — | V |

FIG. 6 to FIG. 9 are schematic diagrams illustrating an exemplified operation process for an action grouping function residentially operating in the timeline editor in the visualization interface in accordance with the present invention. The platform 130 is further configured to enable an action grouping function which residentially operates in the timeline editor 300 and the visual programming panel 136 to form an action group (action collection) and is activated by pressing one or more user-defined hotkeys.

Figure 6:
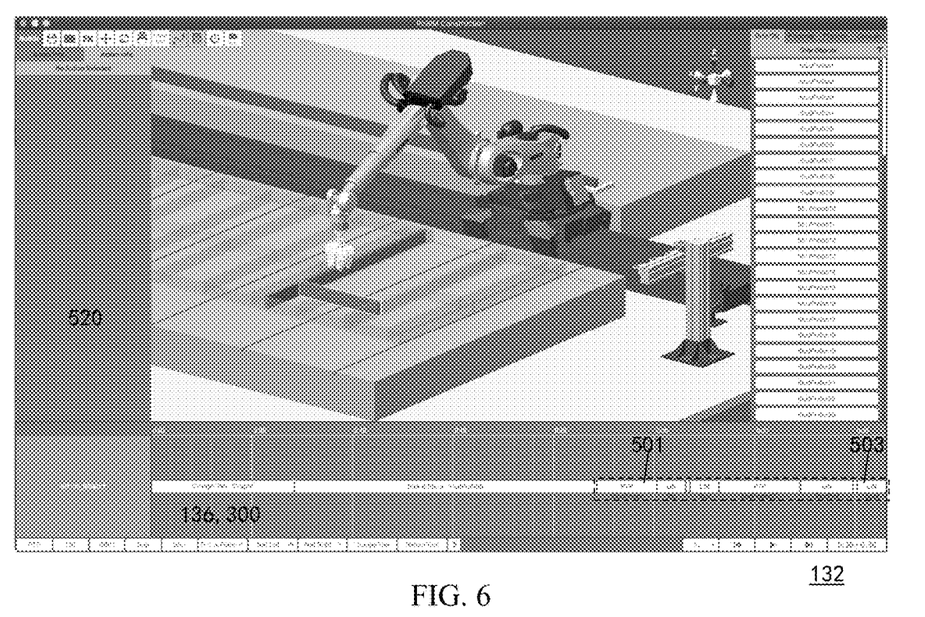
FIG. 6 to FIG. 9 are schematic diagrams illustrating an exemplified operation process for an action grouping function residentially operating in the timeline editor in the visualization interface in accordance with the present invention.

As shown in FIG. 6, there are multiple spatially continuously arranged basic action blocks which are sequenced in the order of PTP-LIN-LIN-PTP-LIN-LIN, which starts at the start action block 501 which is the PTP basic action block in this embodiment, and ends at the end action block 503 which is the LIN basic action block in this embodiment, as shown in and surrounded by a broken line rectangular frame in FIG. 6, on the timeline editor 300.

The above-mentioned action group of spatially continuously arranged basic action blocks may refer to, for example, a structuralized pick and place action. The robotic arm is configured to pick up an object, for example, a wooden panel, at a specific point, move it along a linear trajectory, and place it at a specific point. Such a structured action group is able to be reutilized in many other different scenarios.

Alternatively, the multiple separated basic action blocks aggregated in the structured action group is able to be further simplified, for instances, to be further merged into one single action block, in order to simplify the layout shown in the timeline editor 300. It's helpful for the user to have a quick review and overall comprehension and control on the current chain of actions which is being performing or simulating by the target robot. In order to review as many and simple as possible action blocks within the timeline editor 300, which has a limited visual region subject to the size of monitor, on the visual programming panel 136, it is important to render more action blocks being visible within the timeline editor 300 at the same time.

Figure 7:
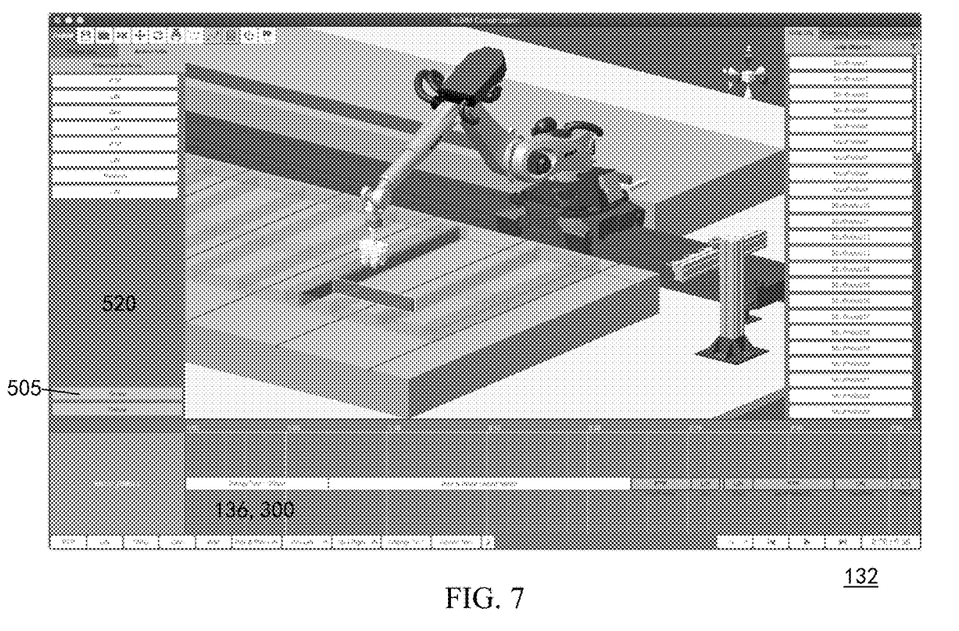

It is configured to activate the action grouping function by, for example, pressing the shift key on the keyboard first, and then clicking a mouse button to select all the action blocks between the start action block 501 through the end action block 503. Releasing the shift key while the required action blocks are all selected, as shown in FIG. 7. The action blocks that are selected by the user and ready to group is shown in a color darker than other action blocks.

Figure 8:
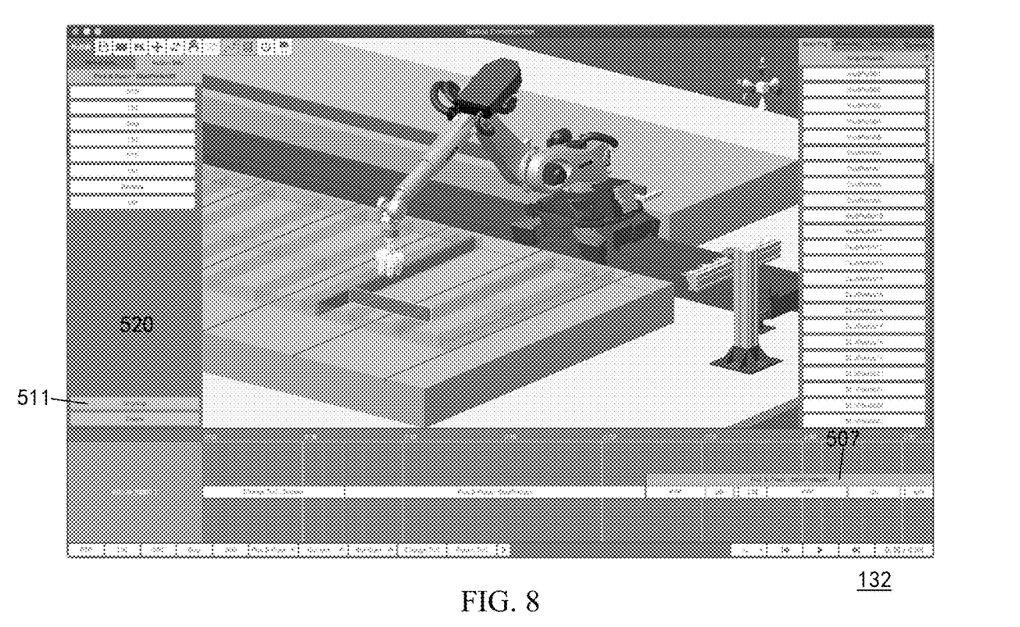
Figure 9:
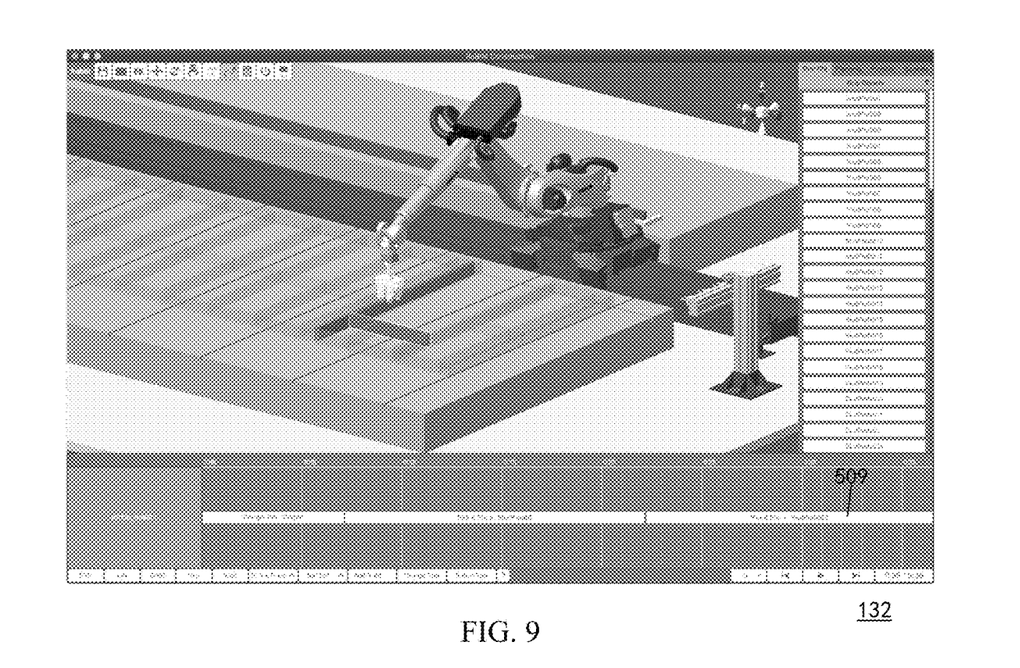

When the selection of the required action blocks is completed, the group button 505 in the action inspector 520 is clicked to group the selected basic action blocks. A transverse continuous bar 507 is placed above all the grouped basic action blocks to represent that the action group status is currently in effective, as shown in FIG. 8. The user is able to further merge the selected grouped basic action blocks into a single action group block 509 by, for example, double clicking one of the grouped basic action blocks, as shown in FIG. 9.

It is configured to ungroup the grouped basic action blocks by selecting one of the grouped basic action blocks, for example, the blocks 501 and 503, and then clicking the ungroup button 511 in the action inspector 520 to ungroup the selected basic action blocks, as show in FIG. 8. After ungrouping, the ungrouped action blocks return to spatially continuously arrange and spread in the order of PTP-LIN-LIN-PTP-LIN-LIN on the timeline editor 300 as shown in FIG. 6.

In brief, the action group is the combination of action items on the timeline panel. It can be expanded to inspect the actions inside or collapsed as a single item. After clicking the action group item on the timeline panel, the action list of the group is shown on the information panel on the left side of the screen.

Figure 10:
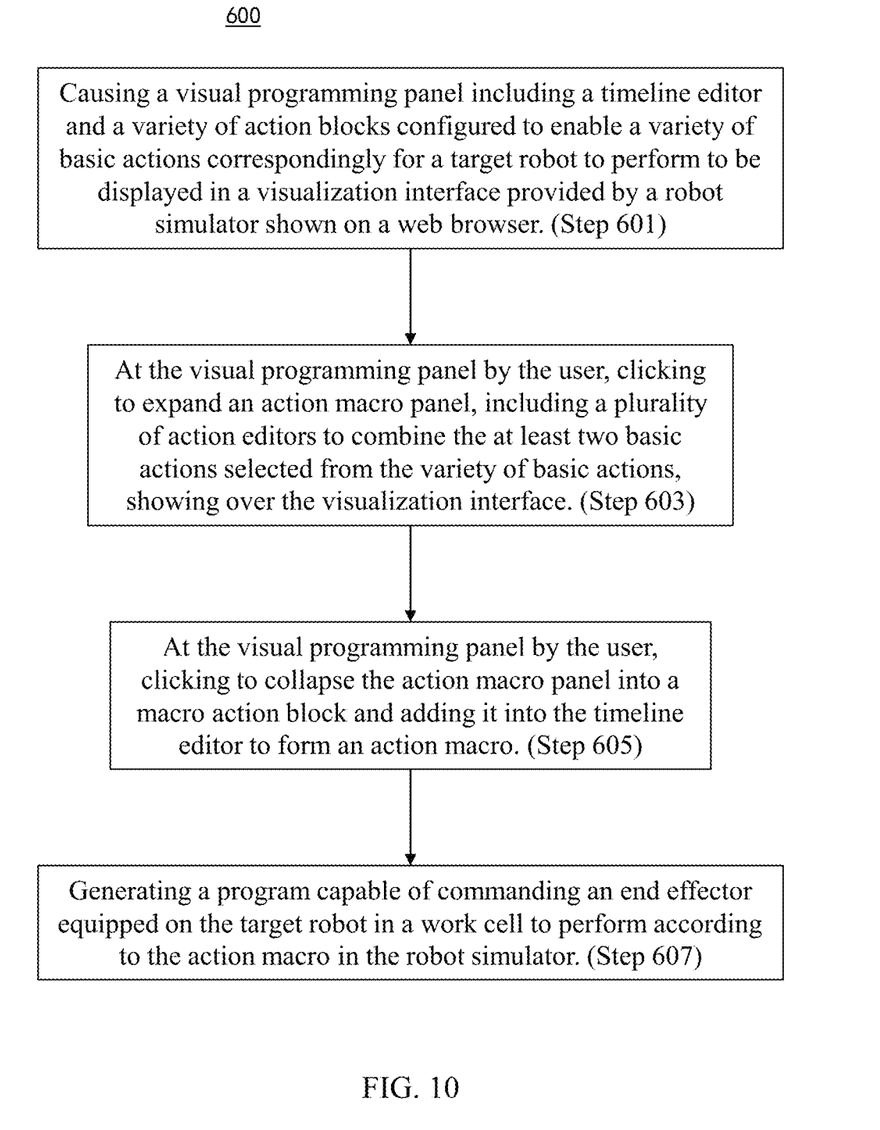
FIG. 10 is a flow chart illustrating a first embodiment of the cloud based computer-implemented method for grouping multiple action items on a visual programming panel in a robot simulator to form an action macro.

FIG. 10 is a flow chart illustrating a first embodiment of the cloud based computer-implemented method for grouping multiple action items on a visual programming panel in a robot simulator to form an action macro. To sum up, the cloud based computer-implemented method 600 for grouping multiple action items on a visual programming panel in a robot simulator to form an action macro in accordance with the present invention preferably includes the steps as follows: causing a visual programming panel including a timeline editor and a variety of action blocks configured to enable a variety of basic actions correspondingly for a target robot to perform to be displayed in a visualization interface provided by a robot simulator shown on a web browser (step 601); at the visual programming panel by the user, clicking to expand an action macro panel, including a plurality of action editors to combine the at least two basic actions selected from the variety of basic actions, showing over the visualization interface (step 603); at the visual programming panel by the user, clicking to collapse the action macro panel into a macro action block and adding it into the timeline editor to form an action macro (step 605); and generating a program capable of commanding an end effector equipped on the target robot in a work cell to perform according to the action macro in the robot simulator (step 607).

Figure 11:
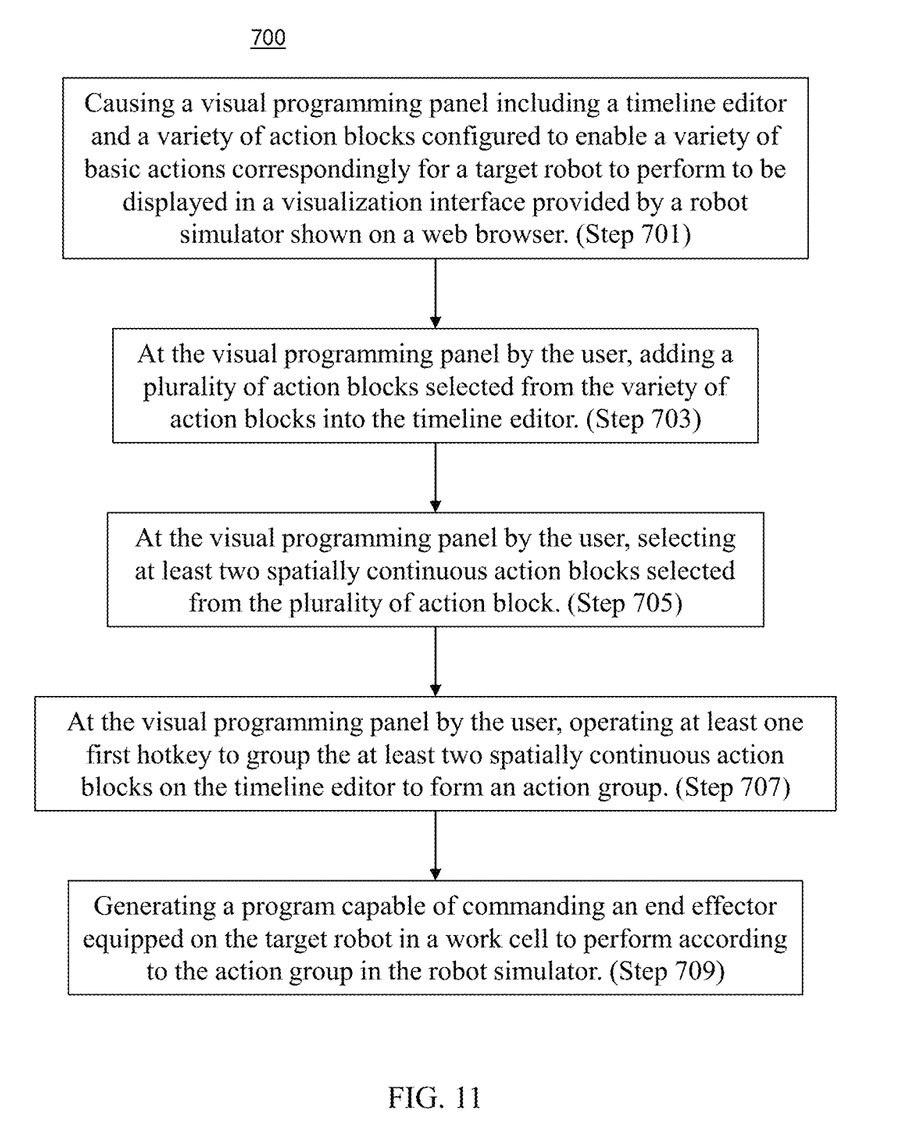
FIG. 11 is a flow chart illustrating a second embodiment of the cloud based computer-implemented method for grouping multiple action items on a visual programming panel in a robot simulator to form an action group.

FIG. 11 is a flow chart illustrating a second embodiment of the cloud based computer-implemented method for grouping multiple action items on a visual programming panel in a robot simulator to form an action group. The cloud based computer-implemented method 700 for grouping multiple action items on a visual programming panel in a robot simulator to form an action group in accordance with the present invention preferably includes the steps as follows: causing a visual programming panel including a timeline editor and a variety of action blocks configured to enable a variety of basic actions correspondingly for a target robot to perform to be displayed in a visualization interface provided by a robot simulator shown on a web browser (step 701); at the visual programming panel by the user, adding a plurality of action blocks selected from the variety of action blocks into the timeline editor (step 703); at the visual programming panel by the user, selecting at least two spatially continuous action blocks selected from the plurality of action block (step 705); at the visual programming panel by the user, operating at least one first hotkey to group the at least two spatially continuous action blocks on the timeline editor to form an action group (step 707); and generating a program capable of commanding an end effector equipped on the target robot in a work cell to perform according to the action group in the robot simulator (step 709).

The contents in section of written descriptions of the invention disclosed in U.S. Provisional Application No. 63/068,063, filed on Aug. 20, 2020, now pending, is fully incorporated by reference as follow.

The present invention provides a functional program component embedded in a robot simulator and is capable of uniting a series of action parameters or action items together, to form an action macro or action group, for a user to use simply by operating a timeline based manually-operated visual panel (an action inspector) in a robot simulator. An action macro is defined as a set of sequential configurations of action parameters. User can add, delete and modify the configurations in the action macro panel. An action group is defined as the combination of action item on timeline panel, and is expanded to inspect the actions inside or collapsed as a single item on demands.

For example, a user manually follows a pre-defined operational protocol to press a series of hot keys with a pre-defined sequence which enables a functional program component pre-loaded into the robot simulator to pop up the action macro panel for operation. The action macro panel is horizontally or vertically enlargeable or expandable. Then the user selects multiple target configurations and parameters in the action macro panel to group them to establish the action macro, and add, delete and modify the selected configurations and parameters through the action macro panel as well. When the action macro is established, the user assigns a codename to the action macro.

For example, a user manually selects and clicks multiple consecutive target action buttons shown in the timeline based manually-operated visual panel by pressing any button on mouse device and simultaneously pressing the shift button on keyboard, to enable the functional program component in the robot simulator to set up the action group.

The robot simulator disclosed in the present invention refers to a cloud-computing based robotic simulator that enables a computer simulation for the prefabricated home builder to simulate, program, and control the industrial robots. It provides a virtual design and validation environment for linking the building information modelling (BIM) model with the robot control. It allows the builder to simulate and control the robot with an animation-based tool, rather than writing codes. The present simulator links BIM design, robot motion planning results and robot control scripts through a cloud server. Complex motion calculations are conducted via cloud-based computation power.

A timeline based manually-operated visual panel module disclosed in the present invention refers to as used for coordinating and scheduling motions of multiple virtual robots which the visual panel is preferably embedded in a browsable robot simulator platform which provides an animation-based programming interface which allows the user to program the robot motions without learning and typing lines of code. The visual panel is configured at the top or the bottom in the animation-based programming interface and presented as a programming panel, and consists of a robot identification window and timeline window in principal. The robot identification window is used for showing a name, a symbol or a code for robots, and the timeline window includes multiple large-scale time division slots further including multiple small-scale time division slots. No matter the multiple large-scale time division slots or the multiple small-scale time division slots, each of slots are equally spaced and distributed in the timeline window:

There are further embodiments provided as follows.

Embodiment 1: A computer-implemented method includes steps of causing a visual programming panel including a timeline editor and a variety of action blocks configured to enable a variety of basic actions correspondingly for a target robot to perform to be displayed in a visualization interface provided by a robot simulator shown on a web browser: at the visual programming panel, operating by a user to group at least two action blocks representing at least two basic actions selected from the variety of basic actions to form an action collection; and generating a program capable of commanding an end effector equipped on the target robot in a work cell to perform according to the action collection in the robot simulator.

Embodiment 2: The computer-implemented method as described in Embodiment 1 further includes one of following steps of at the visual programming panel by the user: clicking to expand an action macro panel, including a plurality of action editors to combine the at least two basic actions selected from the variety of basic actions, showing over the visualization interface; and clicking to collapse the action macro panel into a macro action block and adding it into the timeline editor to form an action macro as the action collection.

Embodiment 3: The computer-implemented method as described in Embodiment 1 further includes one of following steps of at the visual programming panel by the user: adding a plurality of action blocks selected from the variety of action blocks into the timeline editor; selecting at least two spatially continuous action blocks selected from the plurality of action block; and operating at least one first hotkey to group the at least two spatially continuous action blocks on the timeline editor to form an action group as the action collection.

Embodiment 4: The computer-implemented method as described in Embodiment 3 further includes one of following steps of operating at least one second hotkey by the user to ungroup the action group.

Embodiment 5: The computer-implemented method as described in Embodiment 1, the visual programming panel further includes a bottom bar to provide the variety of action blocks for the user to select, and a play button, a forward button, a backward button, and a play speed button, for the user to operate.

Embodiment 6: The computer-implemented method as described in Embodiment 5 further includes one of following steps of pressing the play button to commence an animated simulation demonstrating the process how the end effector and the target robot perform in the work cell according to the action collection at the visual programming panel; and transforming the action collection at the visual programming panel into an action command set that is capable of driving an actual robot corresponding to the target robot in the simulator to move accordingly and outputting the action command set to the actual robot.

Embodiment 7: The computer-implemented method as described in Embodiment 1, the variety of basic actions are selected from a point-to-pint based robotic action, a linear trajectory based robotic action, a grip based robotic action, a pick and place based robotic action, a nailing based robotic action, and a wait based robotic action.

Embodiment 8: A computer-implemented system includes a user device installed with a web browser to enable web browsing to access an internet for a user to operate; and a cloud computing server system available on the internet and configured to: cause a visual programming panel including a timeline editor and a variety of action blocks configured to enable a variety of basic actions correspondingly for a target robot to perform to be displayed in a visualization interface provided by a robot simulator shown on a web browser; at the visual programming panel, operate by a user to group at least two action blocks representing at least two basic actions selected from the variety of basic actions to form an action collection; and generate a program capable of commanding an end effector equipped on the target robot in a work cell to perform according to the action collection in the robot simulator.

Embodiment 9: The computer-implemented system as described in Embodiment 8 further includes the cloud computing server system available on the internet and configured to: at the visual programming panel by the user: click to expand an action macro panel, including a plurality of action editors to combine the at least two basic actions selected from the variety of basic actions, showing over the visualization interface; and click to collapse the action macro panel into a macro action block and adding it into the timeline editor to form an action macro as the action collection.

Embodiment 10: The computer-implemented system as described in Embodiment 8 further includes the cloud computing server system available on the internet and configured to: at the visual programming panel by the user: add a plurality of action blocks selected from the variety of action blocks into the timeline editor; select at least two spatially continuous action blocks selected from the plurality of action block; and operate at least one first hotkey to group the at least two spatially continuous action blocks on the timeline editor to form an action group as the action collection.

Embodiment 11: The computer-implemented system as described in Embodiment 8 further includes one of following elements: a computer-assisted cloud based robotic construction platform installed on the cloud computing server system and configured to provide the visualization interface for a user to operate through the web browser, wherein the computer-assisted cloud based robotic construction platform is established based on the software as a service (SAAS) technology and the platform as a service (PAAS) technology; and the user device providing and running the web browser for the user to operate to access the computer-assisted cloud based robotic construction platform on the cloud computing server system remotely through the visualization interface to create the action collection.

While the disclosure has been described in terms of what are presently considered to be the most practical and preferred embodiments, it is to be understood that the disclosure need not be limited to the disclosed embodiments. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present disclosure which is defined by the appended claims.

What is claimed is:

1. A computer-implemented method, comprising:
   providing a computer-assisted cloud based robotic construction software platform which integrates and comprises an externally-operated building information model (BIM) module for linking BIM data to robot controls, and a robot simulator, for a user to select and operate, so as to enable a comprehensive online cloud computation based computer-assisted virtual planning, simulation, and demonstration for a virtual robotic device corresponding to a robotic device in reality, wherein the robotic device in reality performing robot motions is dedicated to prefabricate a plurality of construction components in an off-site robotic semi-automated building construction work in the field of civil engineering in accordance with a BIM data imported from the externally-operated BIM module and corresponding to actual building construction information conditions in reality in the off-site robotic semi-automated building construction work;
   causing a visual programming panel comprising a timeline editor with a plurality of timescales that are spaced at a plurality of equal intervals to indicate a fixed time interval for a visual programming associated to a target robot and a variety of action blocks configured to represent and enable a variety of basic actions correspondingly for the target robot to perform to be displayed in a visualization interface provided by a robot simulator shown on a web browser;
   at the visual programming panel, operating by a user to select a plurality of action blocks representing a combination of basic actions out of from the variety of action blocks and to add the plurality of action blocks into the timeline editor according to a temporal sequence of performance that the target robot is scheduled to perform the plurality of action blocks in time, wherein an order of the spatial arrangement of the plurality of action blocks in the timeline editor is the temporal sequence of performance, and each of the plurality of action blocks has a length which is adjustable to represent a duration of its runtime with reference to the plurality of timescales provided on the timeline editor,
   wherein the plurality of action blocks includes a customizable blank block that allows a user to define and configure to form and represent a new specific basic action;
   at the visual programming panel, operating by the user to group the plurality of action blocks representing the combination of basic actions selected from the variety of basic actions to form an action collection;
   visually simulating that the target robot performs the combination of basic actions represented by the plurality of action blocks according to the temporal sequence of performance defined in the timeline editor in the visualization interface provided by the robot simulator shown on the web browser by an animated simulation; and
   generating a program configured to command an end effector equipped on the target robot in a work cell to perform according to the action collection in the robot simulator.

2. The computer-implemented method as claimed in claim 1, further comprising:
   at the visual programming panel by the user:
      clicking to expand an action macro panel, comprising a plurality of action editors to combine the combination of basic actions selected from the variety of basic actions, showing over the visualization interface; and
      clicking to collapse the action macro panel into a macro action block and adding it into the timeline editor to form an action macro as the action collection.

3. The computer-implemented method as claimed in claim 1, further comprising:
   at the visual programming panel by the user:
      adding the plurality of action blocks selected from the variety of action blocks into the timeline editor;
      selecting at least two spatially continuous action blocks selected from the plurality of action block; and
      operating at least one first hotkey to group the at least two spatially continuous action blocks on the timeline editor to form an action group as the action collection.

4. The computer-implemented method as claimed in claim 3, further comprising:
   operating at least one second hotkey by the user to ungroup the action group.

5. The computer-implemented method as claimed in claim 1, wherein the visual programming panel further comprises a bottom bar to provide the variety of action blocks for the user to select, and a play button, a forward button, a backward button, and a play speed button, for the user to operate.

6. The computer-implemented method as claimed in claim 5, further comprising one of following steps:
   pressing the play button to commence an animated simulation demonstrating the process how the end effector and the target robot perform in the work cell according to the action collection at the visual programming panel; and
   transforming the action collection at the visual programming panel into an action command set that is capable of driving an actual robot corresponding to the target robot in the simulator to move accordingly and outputting the action command set to the actual robot.

7. The computer-implemented method as claimed in claim 1, wherein the variety of basic actions are selected from a point-to-pint based robotic action, a linear trajectory based robotic action, a grip based robotic action, a pick and place based robotic action, a nailing based robotic action, and a wait based robotic action.

8. A computer-implemented system, comprising:
   a user device installed with a web browser to enable web browsing to access an internet for a user to operate; and
   a cloud computing server system available on the internet and configured to:
      provide a computer-assisted cloud based robotic construction software platform which integrates and comprises an externally-operated building information model (BIM) module for linking BIM data to robot controls, and a robot simulator, for a user to select and operate, so as to enable a comprehensive online cloud computation based computer-assisted virtual planning, simulation, and demonstration for a virtual robotic device corresponding to a robotic device in reality, wherein the robotic device in reality performing robot motions is dedicated to prefabricate a plurality of construction components in an off-site robotic semi-automated building construction work in the field of civil engineering in accordance with a BIM data imported from the externally-operated BIM module and corresponding to actual building construction information conditions in reality in the off-site robotic semi-automated building construction work;

cause a visual programming panel comprising a timeline editor with a plurality of timescales that are spaced at a plurality of equal intervals to indicate a fixed time interval for a visual programming associated to a target robot and a variety of action blocks configured to represent and enable a variety of basic actions correspondingly for the target robot to perform to be displayed in a visualization interface provided by a robot simulator shown on a web browser;

at the visual programming panel, operate by a user to select a plurality of action blocks representing a combination of basic actions out of from the variety of action blocks and to add the plurality of action blocks into the timeline editor according to a temporal sequence of performance that the target robot is scheduled to perform the plurality of action blocks in time, wherein an order of the spatial arrangement of the plurality of action blocks in the timeline editor is the temporal sequence of performance, and each of the plurality of action blocks has a length which is adjustable to represent a duration of its runtime with reference to the plurality of timescales provided on the timeline editor, wherein the plurality of action blocks includes a customizable blank block that allows a user to define and configure to form and represent a new specific basic action;

at the visual programming panel, operate by the user to group the plurality of action blocks action blocks representing a combination of basic actions selected from the variety of basic actions to form an action collection;

visually simulate that the target robot performs the combination of basic actions represented by the plurality of action blocks according to the temporal sequence of performance defined in the timeline editor in the visualization interface provided by the robot simulator shown on the web browser by an animated simulation; and generate a program configured to command an end effector equipped on the target robot in a work cell to perform according to the action collection in the robot simulator.

9. The computer-implemented system as claimed in claim 8, further comprising:

the cloud computing server system available on the internet and configured to:

at the visual programming panel by the user:

click to expand an action macro panel, comprising a plurality of action editors to combine the combination of basic actions selected from the variety of basic actions, showing over the visualization interface; and click to collapse the action macro panel into a macro action block and adding it into the timeline editor to form an action macro as the action collection.

10. The computer-implemented system as claimed in claim 8, further comprising:

the cloud computing server system available on the internet and configured to:

at the visual programming panel by the user:

add the plurality of action blocks selected from the variety of action blocks into the timeline editor;

select at least two spatially continuous action blocks selected from the plurality of action block; and operate at least one first hotkey to group the at least two spatially continuous action blocks on the timeline editor to form an action group as the action collection.

11. The computer-implemented system as claimed in claim 8, further comprising one of following elements:

a computer-assisted cloud based robotic construction platform installed on the cloud computing server system and configured to provide the visualization interface for a user to operate through the web browser, wherein the computer-assisted cloud based robotic construction platform is established based on the software as a service (SAAS) technology and the platform as a service (PAAS) technology; and the user device providing and running the web browser for the user to operate to access the computer-assisted cloud based robotic construction platform on the cloud computing server system remotely through the visualization interface to create the action collection.

* * * * *